219-121
1/25/83
SR
OR 4,370,538

United States Patent [19]

Browning

[11] 4,370,538

[45] Jan. 25, 1983

[54] METHOD AND APPARATUS FOR ULTRA HIGH VELOCITY DUAL STREAM METAL FLAME SPRAYING

[75] Inventor: James A. Browning, Hanover, N.H.

[73] Assignee: Browning Engineering Corporation, Hanover, N.H.

[21] Appl. No.: 152,966

[22] Filed: May 23, 1980

[51] Int. Cl.[3] .................. B23K 9/00

[52] U.S. Cl. .................. 219/121 PY; 219/121 PL; 219/121 PQ; 219/121 PS; 219/76.16; 239/13; 239/81; 239/83; 313/231.41

[58] Field of Search ....... 219/76.16, 121 PL, 121 PY, 219/121 PQ, 121 PS, 121 PP, 74, 75; 29/DIG. 39; 228/256, 261, 263; 239/13, 79, 8, 80, 81, 83-85, DIG. 7; 313/231.4-231.7

[56] References Cited

U.S. PATENT DOCUMENTS

| | | | |
|---|---|---|---|
| 2,340,903 | 2/1944 | Shepard | 239/83 |
| 3,006,555 | 10/1961 | Navara | 239/83 |
| 3,851,140 | 11/1974 | Coucher | 219/121 PL |
| 4,121,082 | 10/1978 | Harrington et al. | 219/121 PL |
| 4,174,477 | 11/1979 | Essers et al. | 219/121 PP |
| 4,181,256 | 1/1980 | Kasagi | 239/81 |

FOREIGN PATENT DOCUMENTS

| | | | |
|---|---|---|---|
| 661080 | 4/1963 | Canada | 239/83 |
| 931438 | 8/1973 | Canada | 239/81 |

*Primary Examiner*—M. H. Paschall
*Attorney, Agent, or Firm*—Sughrue, Mion, Zinn, Macpeak & Seas

[57] ABSTRACT

A high velocity gaseous accelerating secondary jet stream in the form of the products of combustion of an internal burner is directed as a converging annular flow about and into a primary jet stream of high temperature bearing melted particles to accelerate the particles for improved impingement coating of a substrate with the internal burner operated under parameters such that the secondary jet stream is at sufficiently high temperature to prevent solidification of the particles during transport by the higher molten secondary stream prior to impact on the substrate surface.

14 Claims, 8 Drawing Figures

METHOD AND APPARATUS FOR ULTRA HIGH VELOCITY DUAL STREAM METAL FLAME SPRAYING

FIELD OF THE INVENTION

This invention relates to a plasma spray torches and more particularly to a molten metal spraying system for increasing the temperature and velocity of the molten spray stream.

SUMMARY OF THE INVENTION

The present invention is directed to a method and apparatus for ultra high velocity flame spraying of metal, refractory materials or the like and is characterized by a dual-element system in which a hot gaseous primary jet stream of relatively low momentum fuses and projects a stream of molten particles into a second gaseous jet stream of lower temperature but possessing a very high momentum. The first stream may be an oxy-fuel flame or an electric arc-producing plasma and the second stream may comprise a flame-jet produced by an air fuel flame reacting at high pressure in an internal burner device.

The combining of these two streams must be effected in a particular manner and the invention is highlighted by the fact that the second stream, most frequently a supersonic jet stream, impinges the entrained molten particles against the surface to be coated at ultra-high velocity. The coatings, thus, are characterized by extremely high densities and have excellent strength in both shear and bonding to the substrate. The present invention not only improves the quality of the coatings so produced, but the present invention makes it possible to flame spray materials of a melting point higher than that of the accelerating air-fuel flame jet. This allows the high momentum flame-jet to be used with such material as aluminum and zirconium oxides as well as tungsten carbide and other refractory materials. It is only necessary that the material to be fused be suspended a sufficient amount of time in the high-temperature primary stream to effect required melting prior to contact with the substrate being coated. These particles of higher melting point and the accelerating stream, must be deposited on the object to be coated before turning solid.

Specifically, one form, the flame spraying method of the present invention comprises the steps of producing a stream of powders suspended in a primary jet carrier gas and applying thereto a high velocity accelerating secondary jet of heated gas with said gaseous jet secondary being formed from a converging annular flow of gas from a series of closely spaced nozzle orifices or a continuous slot of circumferential ring geometry and wherein, the stream of particles are introduced into the diminishing core section defining the inner envelope of said converging annular gas flow to thus accelerate the particles within the gaseous flow to extremely high velocity prior to impact against the substrate surface to be coated. Alternatively, a wire or rod of material which could be melted is fed to the center of the converging annular flow of high velocity accelerating secondary gas jet. The powder flow or wire rod may be melted by an oxy-fuel or plasma flame jet of higher temperature than the accelerating jet with the particles being completely melted prior to introduction into the accelerating jet. Alternatively, an arc heating source may be stuck between two continuously moving wires or rods or electrically conductive metal with the resulting molten particles being carried by a gaseous flow into the accelerating gaseous jet region. The accelerating gaseous annular converging jet may be a high-velocity stream of compressed air or the products of combustion from an air-fuel internal burner. Further, the gaseous annular converging jet may have its outer boundary constrained to flow as a cylinder with an elongated central core of relatively low velocity and wherein the introduced molten particulate matter to the core region is focused so as to flow in a small diameter cylindrical stream.

In another aspect, the invention comprises a 2-wire arc spray system comprising means for continuously feeding of two wires along intersecting paths, means for establishing an arc between the terminal points of the wires to cause melting of each wire, and means for atomizing and accelerating molten particles from said wires by means of a high-velocity heated gas secondary jet to impact said particles against a surface to be coated.

The invention further envisions a plasma-arc flame spray system as comprising a transferred-arc plasma torch which is axially separated from the entry bore of the anode element, means for establishing an arc column passing from an internal first electrode within the plasma torch through a constricting bore nozzle of the torch, with the arc column passing at least axially part way through the exit bore of said anode element and means for passing a flow of powder to be melted into or near the exit of the plasma torch nozzle bore and along said axially extending arc column and into a high-velocity gaseous accelerating flow so as to impinge the accelerated particles against a surface to be coated.

DESCRIPTION OF THE PREFERRED EMBODIMENT

Figure 2:
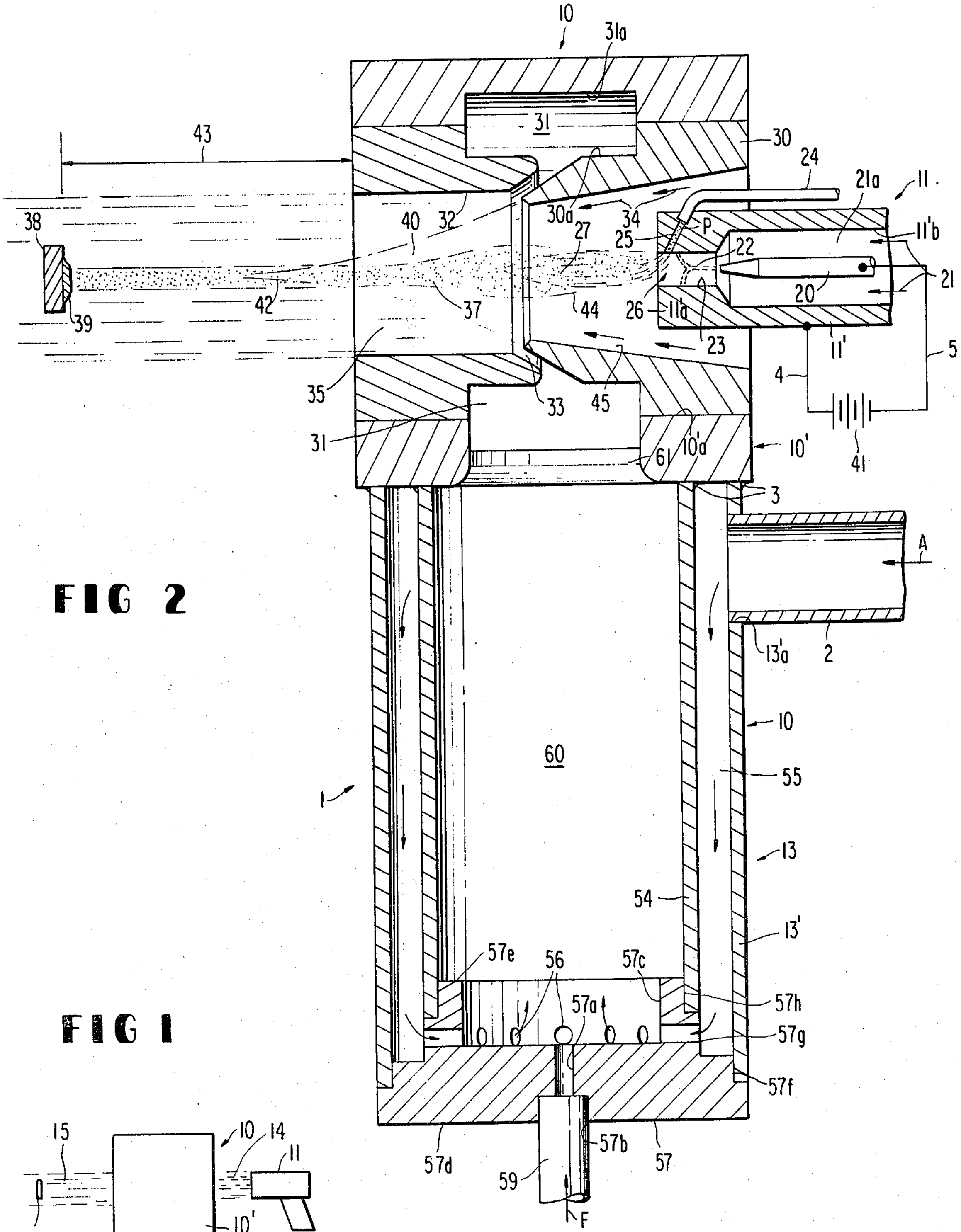
FIG. 2 is a cross-sectional view of the plasma torch and air-fuel burner constituting the ultra-high velocity dual stream metal flame spraying apparatus of FIG. 1.
Figure 1:
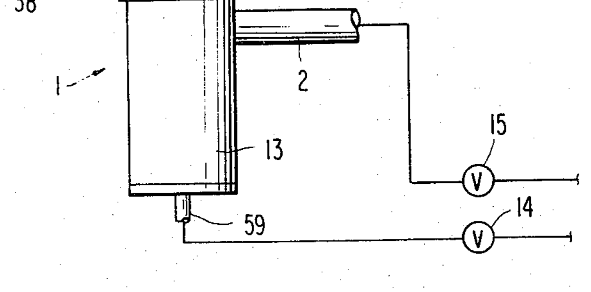
FIG. 1 is a side elevational view of the ultra-high velocity, dual stream particle flame spraying apparatus of the present invention in one form.

Referring to FIG. 1, that Figure illustrates somewhat schematically the main elements of the overall dual-stream metallizing (flame spraying) apparatus of the present invention as one embodiment, which is further illustrated sectionally in FIG. 2. The apparatus indicated generally at 1 comprises a fusing element indicated generally at 11 which may be either an oxy-fuel wire or powder gun which discharges a molten primary jet stream of particles as at 14 into the intake or inlet of the air fuel flame accelerator 10. Accelerator 10 in turn speeds up the molten particles to an ultra-high or extreme velocity with these particles being projected by stream 15 to the discharge side of the accelerator 10. The particles are projected against a solid object or substrate 38 to produce a coating 39 on the surface of the object 38 facing the stream 15. The accelerator indicated generally at 10 comprises two major elements. These are the lower burner portion or internal burner 13 and a manifold-nozzle 10'. The burner portion 10 requires a fuel and air mixture, the fuel being delivered to the burner portion 13 by way of fuel inlet tube 59 and air by way of an air inlet tube 2. Valve 14 within the air inlet tube or line 59, and valve 15, within the air inlet tube or line 2, act to control the inlet flow of fuel and compressed air respectively to the internal burner 13.

By reference to FIG. 2, the apparatus 1 constituting one embodiment of the present invention may be seen in detail by way of its sectional illustration. The internal burner 13 forming the second major portion or element of accelerator 10 comprises an outer cylindrical body or outer tube 13 consecutively surrounding but spaced from an inner, cylindrical, combustion tube 54. The combustion tube 54 defines a combustion chamber 60 along with an annular, circular cap 57 constituting an injector element manifold nozzle 10'. Tube 13' is provided with an opening 13'*a* within which is received the end of the air pipe tube 2 such that air may enter the cylindrical chamber annular passage 55 between tube 13' and tube 54. Thus, a cooling flow of air surrounds the burner combustion chamber 60 although, in certain cases water cooling may be alternatively employed.

The injector element 57 comprises a metal cap including a bore 57*a* and a counter bore 57*b* within the exterior face 57*d* and within which the end of the fuel supply tube 59 is received such that the fuel tube 59 communicates with the bore 57*a* for delivering fuel to the interior of the combustion chamber at that end. The cap 57 is further counter bored at 57*c* on the opposite face 57*e* to that of 57*d*. On its outer periphery, the cap 57 is progressively recessed to smaller diameters as at 57*f*, 57*g* and 57*h*, one end of tube 13 being received within the peripherial recess 57*f* while, the peripherial recess 57*h* receives a corresponding end of shorter length combustion tube 54. Cap 57 is welded or otherwise affixed to the ends of tubes 54 and 13', the opposite ends of these tubes being welded as indicated at 3 to the manifold-nozzle 10'. Further, a plurality of radial holes 58 are provided within counter bore portion 57*c* of cap 57 opening to the annular passage 55 so as to permit, the compressed air to enter the combustion chamber through the small diameter holes or injectors 56 for the burner. The incoming air flow is indicated by arrow A, FIG. 2, the air acting to asperate the fuel indicated by arrow F into the combustion chamber. Ignition means (not shown) are provided for insuring combustion of the fuel air mixture within the combustion chamber with the hot gases from the burner 10 exiting from the combustion chamber 60 through a central exit passage 61 of the manifold-nozzle 10'.

Using oil or fuel gas as the fuel F, essentially complete combustion takes place in the internal burner 13 and only the hot products of combustion pass into an annular manifold 31 of the manifold-nozzle 10' through exit passage 61. Applicant has determined that this action is of great importance to many spraying situations. Very little free oxygen is available in the accelerating stream to cause harmful oxidation of the particles being transmitted at ultra-high velocity and of the object to be coated, which is disposed in the path of that stream.

FIG. 2 adequately illustrates in detail the combination or duel stream action in the flame spray method of the present invention. In the illustrated embodiment of FIGS. 1 and 2, a standard type plasma spray torch 11 produces the primary hot jet stream indicated generally at 26 which is used to fuse the powder P flowing from a powder supply tube 24 through an inclined passage 25 into the primary hot jet stream 26 just downstream from end 11'*a* of plasma torch outer body 11'. The major components of the plasma torch 11 constitutes the annular outer body 11' terminating in a nozzle bore 23 and including a counter bore 11'*b* within which is positioned a tungsten cathode electrode 20 which terminates within counter bore 11'*b* and in front of one end of an elongated nozzle bore 23. Electric power from an appropriate DC source is connected across the electrode 20 and the outer body 11', the connection shown schematically to battery 41, by way of leads 4 and 5 to the electrode 20 and body 11' respectively thereby creating an arc 22 forced well down base 23 by gas flow 21. Primary gas flow is indicated schematically by arrows 21 within an annular chamber 21*a* defined by the counter bore 11'*b* and electrode 20.

The entrained particles 27 in the hot primary jet 26 must remain within the hot stream for a certain period of time for complete melting to take place. For a given particle velocity this translates into a minimum separation distance beyond the exist nozzle of torch 11 from the point where the particles are mixed into the accelerating stream 35 of much lower temperature. Except for the very lowest melting materials, i.e., zinc and aluminum, no further heating of the particles can take place once they enter the cooler accelerating stream 35. Usually this distance is that distance which separates the torch 11 and work piece or substrate 38 in the absence of accelerator 10, a distance normally specified by the plasma torch manufacturer. For example if the optimum spray distance (in the absence of the accelerator 10) is 4 inches, then the plasma torch face should be nearly 4 inches away from the mixing region indicated generally at 42 for the primary hot jet 26 and the accelerating stream 35.

The accelerator element 10 outer body or manifold-nozzle 10' bears a annular insert 30. The outer body includes at one circumferential position a radial opening or exit passage 61 leading from the combustion chamber 6. It also is provided with an annular recess within its inner periphery 10'*a* as at 31*a*, this annular recess 31*a* being mirrored within the outer periphery of the annular inset 30 as at 30*a* and forming, an annular passage 31 which carries the flame product gases from the exit passage 61 completely around (through 360° ) of the circumferential manifold nozzle 10'. From this annular manifold passage 31 the hot gases expand to ambient atmospheric pressurè through a continuous annular inclined slot 33 to form an annular accelerating secondary gaseous jet stream or flame jet 35 possessing a low velocity core 40 through the molten particles 27, plasma gases 26 and aspirated atmospheric air (or inert gas) flow as indicated by arrows 34. Core 40 continuously diminishes in diameter until it disapears in the vicinity of point 42, beyond which the combined stream of gases is "solid?". Thus a coating 39 of very high temperature and extremely high velocity particles are applied to the surface of the work piece 38 facing the combined accelerating secondary and primary hot jet stream streams 35, 36, respectively.

In much the same manner as the flow distance required by the hot primary jet gas flow to melt the solid particles eminating from passage 25, a dwell time of the molten particles in the cooler accelerating stream 35 is also necessary. The greater this dwell time (until the point where atmospheric mixing and sheer greatly reduce the velocity of accelerating stream 35) the greater the particle velocity. Thus, the stand-off distance 43 should be the maximum distance from the spray apparatus where the particles are still molten.

During the testing program to investigate dual-stream spraying phenomenon as evidenced in this embodiment and other embodiments of the invention, a totally unexpected result occurs. The plasma gas primary jet stream 26 forms an extended heated gas stream passing away from the torch 11. This stream has an outer boundary 44 which, were the stream being discharged to the open atmosphere, continously expands in diameter. The envelope containing the spray particles within this stream is a conical expansion growing ever larger in diameter with distance away from torch 11.

The unexpected phenomenon concerns the shape and size of the particle envelope when the plasma torch (or oxy-fuel unit) is coupled with the accelerator 10. The hot gases and spray particle pattern first begin their normal expansion as may be seen in FIG. 2. At a given point along the converging inlet passage 45, which converges in the direction of the streams, the aspirated gases indicated by arrows 34 pass into the flame spray area between torch 11 and the annular inset 30 upstream of the primary hot jet discharge of torch 11 and act to surround the hot gas flow 26. These aspirated gases possess an appreciable radial inward velocity component and squeeze both the hot gases and the particles which are entrained at 27 into flows of smaller diameter. A maximum hot gas flow diameter is shown at 36. As the flow passes into core 40 shearing forces from the high velocity (even a supersonic) flow 35 accelerate the particles to an even higher velocity. The result for the conditions of the embodiment illustrated in FIG. 2 is a "focused" stream 37 of molten particle of constant small diameter extending to over 2 feet into the open atmosphere "in the absence of work piece 38".

This focused particle flow is of considerable practical importance. First, when a small object is to be coated in a particle spray pattern of much larger cross-sectional area a major quantity of the often expensive spray material is lost as over-spray. Where the focused particle stream is used, over-spray may often be essentially eliminated.

A second advantage of the focused particle stream is the rapid coating build-up possible. The solidifying particles (or surface of the coating) are exposed to atmospheric oxidation or other adverse chemical effects for much shorter periods of time.

Figure 3:
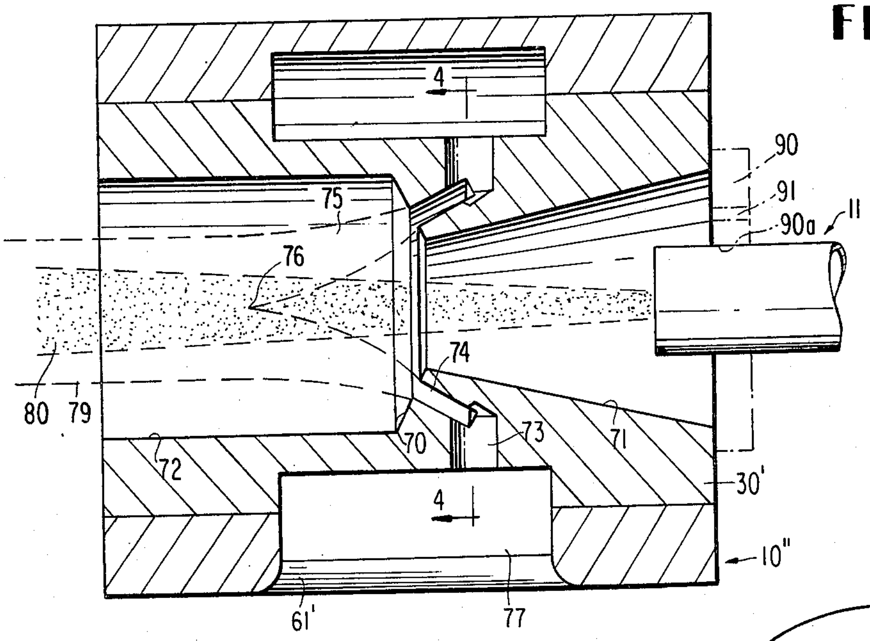
FIG. 3 is a sectional view of a modified embodiment of the ultra-high velocity, dual stream flame spraying apparatus of the present invention.

The "focusing" mode of acceleration as employed in the embodiment of FIG. 2 is optimized by the flow regime of the accelerating secondary jet stream 35. This flow tends to hug the outlet passage wall 32 of the annular insert, that is down stream of inclined inlet or slot 33, probably by the COANDA effect. The streamlines become quite smooth. By the time the molten particles reach this secondary accelerating stream 35 as at 42, little radial velocity within the secondary accelerating stream 35 exists. This effect may be compared with the more turbulent flow regime of the accelerating gases employed in connection with the embodiment of FIG. 3. In FIG. 3, a second embodiment of the dual stream flame spraying apparatus of the present invention is illustrated, in this case burner 13 is purposely not illustrated, the outer body or manifold-nozzle 10' is provided with the inlet opening 61' feeding burner gases to an annular manifold 77 formed by annular recesses within the outer periphery of annular insert 30' and the inner periphery of the manifold-nozzle 10'. Insert 30' comprises a tapered inlet bore 71 which converges from the end receiving the tip of plasma torch 11, the insert 30' further including an outlet or exit bore 72 of uniform diameter throughout its length and being somewhat larger in diameter than the diameter of inlet bore 71 near the intersection of these two bores. An inclined end wall 70 joins the end of the inlet bore 71 with the exit bore 72 and bears, a continuous inclined, circumferential slot 74. Slot 74 which communicates to the annular manifold 77 by way of a plurality of circumferential spaced, radial holes 73 which extend radially inwardly of the annular manifold 77 within insert 30' to the extent of the continuously circumferential slot 74. The cross-sectional flow path area of the radial holes 73 is greater than that of annular slot 74 and thus slot 74 serves as the nozzle for this device.

The slot 74 directs the hot secondary accelerating gas flow to bore 72 at a position radially inwardly from the wall of that bore. The Coanda effect does not take place in the annular jet stream 75 eminating from the slot 74, and it quickly converges to form a single jet stream 79 at point 76. A spray of liquid particles 80 introduced into this secondary, accelerating stream 75 diverges with distance from the flame spray apparatus. For cases where large areas are to be flame sprayed, this wider spray pattern is more desirable than the "focused" particle stream of the embodiment of the invention of FIG. 3. Much less atmospheric air is aspirated and entrained in jet 79; thus the jet velocity is greater and the particles impact at greater velocity against the surface being coated (not shown). It may be thus appreciated that the position of the slot-nozzle (33 of the embodiment of FIG. 2, and 74 of the embodiment of FIG. 3) governs the type of accelerator action both with respect to spray pattern and particle impact velocity. By intermediate placement of the slot, that is, between the extremes of FIGS. 2 and 3, variations in flame spray characteristics and properties are achieved.

Where materials of high oxidation susceptibility are flame sprayed, oxygen injection from the atmospheric air (about plasma torch 11) may be eliminated by means of a baffle to cause the annular jet 75 to form a single jet 79. FIG. 3 illustrates in dotted line fashion baffle 90 which is of annular form including an opening *90a* within which the plasma torch 11 projects; the baffle being of a diameter in excess of the diameter of bore 71 and including one or more holes 91 to permit a small amount of atmospheric air to enter the region of bore 71 to reduce the vacuum formed therein. Alternatively where even that small air flow is harmful, an inert gas flow may be substituted. In FIG. 3, the structural and functional aspects which are not specifically discussed in conjunction with this embodiment of the invention are similar to those within the embodiment of FIGS. 1 and 2.

Figure 4:
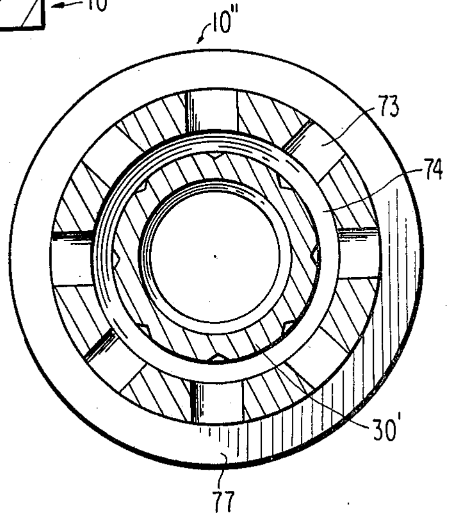
FIG. 4 is a sectional view of a portion of the apparatus of FIG. 3, taken about line 4—4.
Figure 5:
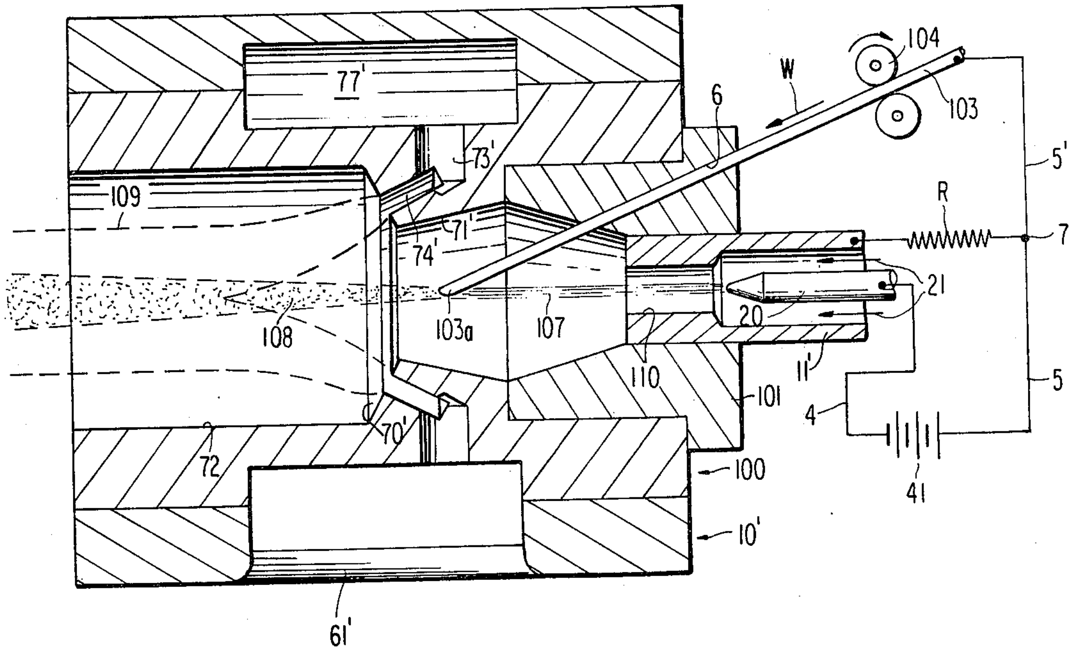
FIG. 5 is a sectional view of an ultra-high velocity dual stream metal flame spraying apparatus incorporating a wire-arc device coupled to the accelerator forming a part of the apparatus of the present invention.

Turning to FIG. 5, there is illustrated another embodiment of the invention. Again the internal burner 13 is purposely not shown, that is the source of the secondary accelerating gases. An outer body indicated generally at 10′ identical to that of the FIGS. 3 and 4 embodiments bears an insert indicated generally at 100. The two are provided with peripheral recesses so as to form an annular passage 77′ to direct the flame product gases eminating through the exit passage 61′ from the internal burner to the interior of insert 100 via multiple radially disposed holes 73′ and a inclined circumferential slot 74′ which opens to inclined wall 70′. Wall 70′ acts to join exit bore 32 with a shorter length converging inlet bore 71′. These aspects of the embodiment of FIG. 5 are essentially identical to the structural make-up of the apparatus of FIGS. 3 and 4. However, in this case a continuously fed metal wire 103 passes through an appropriate small diameter hole or passage 6 within a annular ceramic piece 101 borne by insert 100 which has high electrical resistance. The wire 103 is fed by way of powered rolls as in 104 so as to move the wire in the direction of arrow W. The end of the metal wire 103 at 103*a* is melted (for later acceleration) by an arc 107 issuing from a transferred-arc plasma torch 102. Wire feed passage 6 in the bore 101*a* hold the wire being fed in the plasma torch 11. The sequence of operation involves the strike of a low current non-transferred arc from a cathode 20 to torch bore 110 in body 11′. Hot ionized gas issued axially through and out of bore 110. The "pilot" arc serves to establish the main arc column 107 once the wire 103 moves into the ionized gas stream. The main arc 107 has a much higher current flow than the "pilot" arc whose voltage is limited by resistance R in line 5 between the current source 41 and body 11′. The current source or battery 41 is connected at its opposite side via line 4 to cathode 20. Sufficient gas flow passes through bore 110 as indicated by arrows 21 to help to atomize the molten metal at the wired anode of 103*a* i.e., the tip of the wire 103 which is connected to the battery via line 5; and in parallel with the connection to torch body 11′ through resistance arc. Line 4 connects one side of the battery 41 to the cathode 20 and line 5 connecting the opposite side through resistor R to the body 11′, while line 5′ connects the wire 103 to line 5, insecting that line at point 7, to the battery side of resistor R.

Generally, metal which can be drawn into wire form is much less expensive then a metal in its powdered form. Thus, an arc-wire system is economical to operate and has the capability of depositing material at much higher rates than using either oxy-fuel or non-transferred plasma flame as the melting source. The particles at 108 are imparted the much higher velocity due to the secondary accelerator jet stream 109 impinging on that particle bore primary stream 107 which contacts the wire anode 103*a* where the metal is rendered molten and atomized. In other respects, this embodiment is similar to that of FIG. 3.

Figure 6:
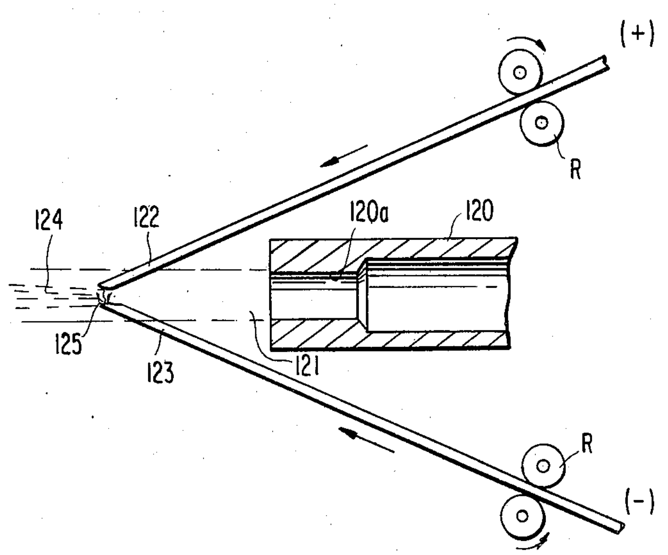
FIG. 6 is a schematic view of a two-wire arc system utilizing an internal burner as an accelerator and forming a modified flame spraying apparatus of the present invention.

The arc wire feed system is an apparatus illustrated in FIG. 5 may be modified, and in particular a two-wire feed system may be employed with the arc drawn between the wire as illustrated in FIG. 6. While, the utilization of a two-wire feed with the arc drawn between the wire is a commercially available technique it has special application to a dual stream method employed by applicant. Its atomized particles may be fed into the hot gas of secondary accelerating stream flow or, conversely, the accelerating flame gas may be substituted for the cold compressed air atomizing flow currently used with conventional two-wired machines.

FIGS. 6 is a schematic illustration of the latter case wherein, in this case, the internal burner 120 feeds the accelerating hot gas stream flow axially rather than delivering the same from a annular manifold as at 77′, of FIG. 5. The internal burner 120 of the schematic representation in FIG. 6 has only that portion at the outlet of the combustion chamber illustrated, the internal burner being otherwise similarly constructed to the internal burner 10 of the internal burner 13 and forming one component of the accelerator in the embodiment of FIGS. 1 and 2. For the purposes of this schematic representation, it may be seen that the axis of nozzle bore 120*a* in the FIG. 6 embodiment is in line with the arc 125 which is generated between anode and cathode wires 122, 123 respectively which are being driven by their roller drive systems R towards each other so that, particles 124 which are atomized from the liquid melt of the anode and cathode wires 122 and 123 are given ultra high speed acceleration by the jet stream 121 eminating from internal burner nozzle 120*a*.

However, the single-wire arc mode of FIG. 5 has several advantages over the double-wire system of FIG. 6, even when such a double wire is atomized prior to particle introduction to the accelerating flow. Cathode heating is more erratic than anode heating in that a cathode spot is extremely small and can wander rapidly over the wire surface. Current densities are extreme leading to sputtering and vaporization of some of the melt material. The material, due to over heating, may be chemically damaged. On the other hand, the anode heating is more spread out. Vaporization may be avoided and, total anode heating is nearly double that of a cathode even though the heat release per unit area is considerably less. Thus, the arc column of FIG. 5 has much greater directional stability than arc 125 of FIG. 6. Much greater current levels may be used leading to a much higher deposition rate in the coating process.

A comparison of the non-transferred arc 22 of FIG. 2 to the transferred-arc 107 of FIG. 5 shows that the later arc may be made much longer in length. It is also known that much higher currents and current density may be employed. In FIG. 2, the powder is introduced into the extremely hot jet stream 26 at a point beyond the anode formation of arc 22. Even though heat transfer rates are high to the powder, much higher rates are possible when the powder is introduced into the arc column itself and where a co-linearly flow of arc plasma and particles is provided.

Figure 7:
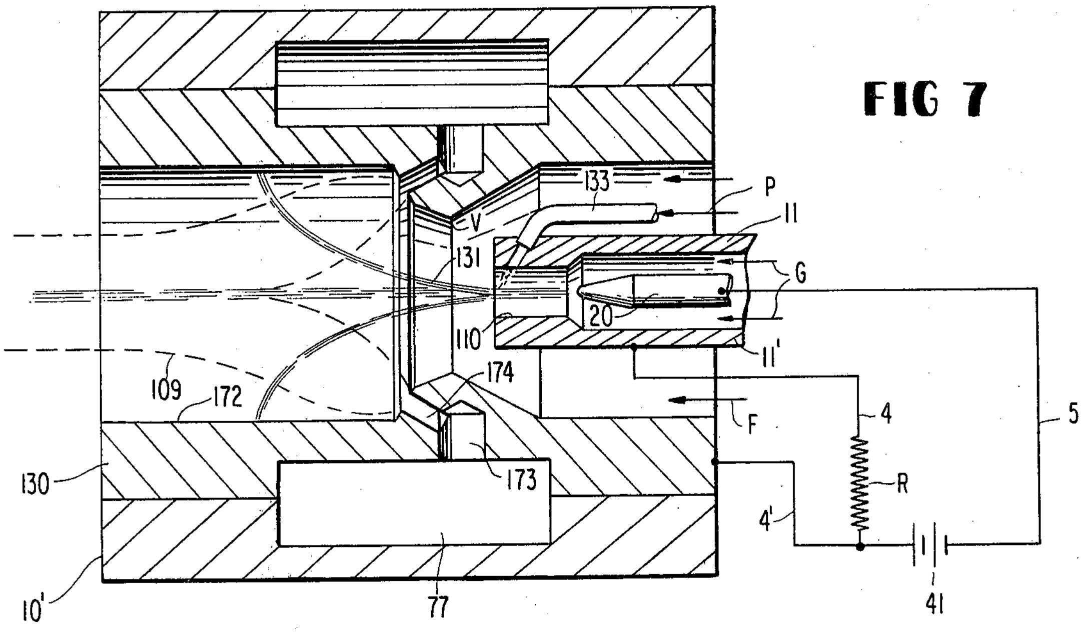
FIG. 7 is yet another embodiment of the ultra-high velocity, dual stream flame spraying apparatus of the present invention including an improved plasma flame melting arrangement employed in conjunction with an accelerating gaseous gas flow.

Use of intense arc column heating of powders (metal or ceramic) is illustrated in the embodiment of FIG. 7. The manifold-nozzle 10′ and the annular insert 130 are essentially identical to the embodiment of FIG. 3, creating an annular manifold passage 77 for distributing the secondary accelerator jet stream gas 360° about this assembly for discharge through the radial holes 173 and annular slot 174 within the annular insert. That secondary jet stream enters the outlet or exit bore 172 of that member. In this embodiment, an arc column 131 extends axially well beyond the exit end of the transferred-arc plasma torch 11. In this assembly, the torch body 11' is provided with a passage 134 which is connected to a tube 133 through which gas powder passes as indicated by arrow P. The powder flows through the extreme intense thermal arc plasma 131 for an appreciable distance from the exit end of nozzle bore 110 of plasma torch 11 and is then introduced into the accelerating flow stream. In this embodiment, the current source or battery 41 has one side connected to cathode 20, via line 5 and the opposite side of the battery is connected to the torch body 11' via line 4 through resistor R while, a line 4' connects that side of the battery or source 41 directly to the annular insert 130 to produce a transfer-arc plasma effect. Gas is delivered to the chamber of torch body 11' as shown by arrows G. Forced gas flow is provided by way of arrows F, FIG. 7 through the annular passage between the annular insert 130 and torch 11 leading to a small venture section via that passage just down stream of the exit end of torch 11. In similar fashion to the prior embodiments, the gas flows converge. The secondary accelerating flow stream which is of lower temperature but of increased velocity is achieved in the same manner as the prior embodiment and illustrated at 109. The embodiment of FIG. 7 provides higher power feed rates and better melting for a given electrical power level. It is noted, that the potential difference between the cathode 20 and the torch body 11' is considerably less due to the voltage drop across the resistor than the potential difference between that cathode and the anode as defined by the annular insert 130.

The various embodiments as illustrated in the Figures and described within the specification exemplify the principles of the invention using several different modes of application. In order to simplify the disclosure the means for water cooling of intensely heated parts is purposely not shown although such may be necessary. The outer casing and insert pieces of FIGS. 2, 3, 4, 5, and 7 may be required to have multiple flow passage through which water is forced to flow to affect the necessary cooling period. The internal burners of FIGS. 2 and 6 may be air cooled for all combustion chamber pressures below 150 PSIG however, although it is believed necessary that water cooling be provided for such internal burners operating at pressures in excess of 150 PSIG.

By practicing the method of the present invention and employing the apparatus as illustrated and described, it is possible to reach extremely high particle impact velocities to form dense coating overlays. Where an internal burner operates at about 100 PSIG level, the gaseous jet velocity is approximately 4,000 feet per second for the secondary gas jet in the various embodiments. Using small powder sizes, the impact velocities range between 2,000 and 3,000 feet per second. Where lesser velocities are acceptable, cold compressed air flow may be substituted for the jet of the internal burner. Impact velocities from 1,000 feet per second to 2,000 feet per second result. Where extremely high impact velocities are required, internal burner combustion pressures of 600 PSIG and higher may be employed, with particle velocities over 4,000 per second resulting. This is nearly an order of magnitude greater than conventional oxy-fuel and plasma flames spraying. It is even well above that of the gun process.

The flame-jet from an air-fuel internal burner has a maximum total temperature of about 3,400° F. This may be greatly reduced by operating the burner with a lean fuel flow rate. This is attractive for the melting and spraying of low melting points materials (either powder or in the form of drawn wire or rod) including zinc, lead and other low melting point metals and plastics.

Figure 8:
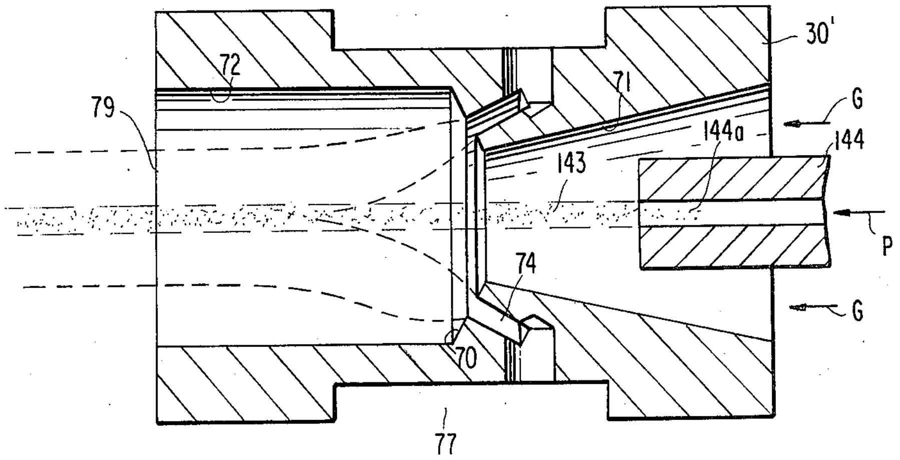
FIG. 8 is a cross-sectional view of a portion of another embodiment of the ultra-high velocity, dual stream flame spraying apparatus of the present invention.

FIG. 8 illustrates one of the simplest embodiments of a flame-jet acceleration system or apparatus where the flame itself serves as the heat source for melting the material. In FIG. 8, only the insert 30' which may be identical to that of the FIG. 3 embodiment is illustrated other then a tube 144 which is positioned within the inlet bore of the converging inlet bore 131 of the annular insert upstream from the location of the circumferential slot 74 for feeds the secondary accelerating jet stream 79 into the outlet or exit passage bore 72 of the annular insert 30'. Insofar as the source and feed of the secondary accelerating jet stream is concerned, it is the same as that discussed in conjunction with the embodiment of FIG. 3 and 4. In this case, the flame itself serves as the heat source for melting the powder material. A powder flow 143 of low melting substance is injected into the flame 141 through the tube 144 using a gaseous carrier. Alternatively, a wire or rod feed can be effected as long as the low melting temperature material wire or rod reaches the area of the secondary accelerating jet stream and in this case flame source 79. Liquid metal may also be fed to that stream eminating from the circumferential slot 74. The powder passes through bore 144*a* of tube through the axial hole 144*a* of the tube as evidenced by arrow P while, arrow G represents the aspirated primary air or other (inert gas) entering the annular passage between tube 144 and inlet bore 71 of the annular insert 30'.

To obtain these high velocities for the entrained particles using a relatively cool accelerating stream of gas, a primary heat source such as air oxy-fuel or plasma flame must be employed for most powdered materials. For this case a minimum period of time must be allowed for melting prior to introduction into the accelerating stream (since the accelerating stream is cooler then the primary jet stream). Where the materials in wire or rod form the molten particles, such can be immediately introduced into the accelerating jet. Where there is shown a circumferential continuously slot to create the secondary accelerating jet stream, a series of closely spaced holes may equally serve this purpose.

While the invention has been particularly shown and described with reference to a preferred embodiment thereof, it will be understood by those skilled in the art that various changes and details may be made therein without departing from the spirit and scope of the invention.

What is claimed is:

1. A flame spraying method comprising the steps of:
forming a primary jet stream of melted material particles suspended in a very hot carrier gas,
igniting a fuel/air mixture in an internal burner combustion chamber to create high pressure, high temperature products of combustion within the confined volume of the combustion chamber,
discharging the hot products of combustion from said internal burner through a manifold nozzle closing off said combustion chamber as a converging annular flow from a circular series of closely spaced nozzle orifices or a narrow continuous slot of circumferential ring geometry including a diminished core section defining the inner envelope of said converging annular secondary jet stream, introducing said primary jet stream molten particles within said carrier gas upstream of and axially into the secondary jet stream in the direction of flow of said secondary jet stream, and controlling combustion within said internal burner to accelerate said molten particles to supersonic velocity and to thereby create an extended length small diameter stream of molten particles downstream of said manifold nozzle of extremely high particle density for rapid, high bonding strength molten particle deposition on a surface to be coated, while maintaining the temperature of the secondary jet stream at a sufficiently high value to prevent solidification of the molten particles prior to impact on said surface.

2. The flame spraying method as claimed in claim 1, wherein said step of forming a primary jet stream of melted material particles suspended in a carrier gas comprises suspending powdered material in said primary jet stream carrier gas and melting said powder to form said melted material particles.

3. The flame spraying method as claimed in claim 1, wherein said step of forming a primary jet stream of melted material particles suspended in a carrier gas comprises feeding of material in wire or rod form into the primary jet stream carrier gas, whose temperature is sufficient to melt said particles.

4. The flame spraying method as claimed in claim 1, wherein said step of forming a primary jet stream of melted material particles suspended in a carrier gas comprises the forming of an oxide-fuel or plasma flame jet of higher temperature than the secondary accelerating jet stream, and wherein said primary jet stream material particles are completely melted prior to introduction of said melted particles into said accelerating secondary jet stream.

5. The flame spraying method as claimed in claim 3, wherein said step of forming a primary jet stream of melted material particles suspended in a carrier gas comprises feeding two continuously moving wires or rods of electrically conductive metal into said stream of carrier gas along intersecting paths and striking an arc between the ends of said wires or rods to produce said molten particles within said primary jet stream for flow into said accelerating gas and secondary accelerating jet stream.

6. The flame spraying method as claimed in claim 1, wherein said step of forming a primary jet stream of melted material particles suspended in a carried gas comprises feeding of a single conductive wire or rod into a plasma arc for melting of said wire or rod material by the entrained gaseous flow prior to the primary jet stream gaseous flow carrying said molten particles to said converging annular secondary jet stream.

7. The flame spraying method as claimed in claim 1 or claim 6, wherein said step of forming a high velocity accelerating secondary jet stream comprises feeding of the products of combustion from a internal burner through a circular series of closely spaced or a continuous slot of circumferential ring geometry from reactants containing a greater percentage of oxygen than that contained in atmospheric air.

8. The flame spraying method as claimed in claim 7, further comprising the step of constraining the outer boundary of the converging annular secondary jet gaseous to cylindrical form having an elongated central core of relatively low velocity, and focussing the melted material particles into a small diameter cylindrical stream at the point of introduction of the melted material particles to the core region of said secondary accelerating jet stream.

9. The flame spraying method as claimed in claim 1, wherein the internal burner is operated at a pressure on the order of 100 psig to 600 psig, and the secondary jet stream is at a velocity of about 1000 to 4000 feet per second.

10. A flame spraying method comprising the steps of:

establishing an arc column between an internal first electrode within a cylindrical plasma torch body and a constricting bore nozzle of said torch body, creating a plasma column annularly separated from the entry bore of an anode element downstream of the exit end of said constricting bore nozzle of said plasma torch body with said arc column passing at least axially part way through the exit bore of the anode element, passing a flow of powder or material to be melted into or near the exit of the plasma torch body nozzle bore and along said axial arc column in said primary jet stream, igniting a fuel/air mixture in an internal burner combustion chamber to create high pressure, high temperature products of combustion within the confined volume of the combustion chamber, causing the products of combustion of said internal burner to exit from said burner through a manifold nozzle closing off one end of the combustion chamber as a converging annular flow of gas from a circular series of closely spaced nozzle orifices or a continuous slot of circumferential ring geometry to form a gaseous accelerating secondary jet stream including a diminished core section defining the inner envlope of said converging annular secondary jet stream into said primary jet stream bearing said melted particles in the same direction of flow as said primary jet stream, and controlling combustion within said internal burner to accelerate said molten particles to supersonic velocity and to thereby create an extended length small diameter stream of molten particles downstream of said manifold nozzle of extreme high practice density for rapid, high bonding strength molten particle deposition on a surface to be coated, while maintaining the temperature of said secondary jet stream at a sufficiently high value to prevent solidification of the molten particles over said extended length necessary to reach supersonic velocity prior to impact on said surface.

11. The flame spraying method as claimed in claim 10, wherein the internal burner is operated at a pressure on the order of 100 psig to 600 psig, and the secondary jet stream is at, a velocity of about 1000 to 4000 feet per second.

12. A supersonic velocity dual stream flame spraying apparatus, said apparatus comprising:

a cylindrical plasma torch body including a constricting bore nozzle, means including said plasma torch body for forming a primary jet stream of melted material particles suspended in a very hot carrier gas and exiting from said constricting bore nozzle of said torch body, an internal burner having a combustion chamber, means for igniting a fuel/air mixture in said internal burner combustion chamber to create high pressure, high temperature products of combustion within the confined volume of said combustion chamber, said internal burner including a manifold nozzle closing off one end of said combustion chamber and having a circular series of closely spaced nozzle orifices or a continuous slot of circumferential ring geometry, said manifold nozzle being positioned downstream and spaced from said constricting bore nozzle of said torch bore body to create an annular gas aspirating passage intermediate of said constricting bore nozzle and said circular series of closely spaced nozzle orifices or said continuous slot of circumferential ring geometry concentrically surrounding the primary jet stream of the melted material particles suspended in the very hot carrier gas exiting from said torch body constricting bore nozzle for creating an accelerating secondary jet stream about said primary jet stream, said said secondary jet stream including a diminished core section defining the inner envelope of said converging annular secondary jet stream with said streams flowing in the same direction, and means for controlling combustion within said internal burner to accelerate said molten particles to supersonic velocity and to thereby create an extended length small diameter stream of molten particles downstreams of said manifold nozzle of extremely high density for rapid, high bonding strength molten particle deposition on a surface to be coated, while maintaining the temperature of said secondary jet stream at a sufficiently high value to prevent solidification of said molten particles prior to impact on said surface with said secondary accelerating jet stream aspirating gas flow through said annular passage preventing normal radial expansion of the plasma gas exiting from said plasma torch constricting bore nozzle by causing aspirated gases to converge in the direction of primary and secondary jet streams to squeeze both hot gas streams and the particles entrained therein to focus the stream of molten particles to a constant small diameter over said extended length.

13. The apparatus as claimed in 12, wherein said means for forming a primary jet stream of melted material particles suspended in a carrier gas comprises means for establishing an arc column between an internal first electrode within a cylindrical plasma torch body and a constricting bore nozzle of said torch body, means for creating a arc plasma torch column annularly separated from the entry bore of an anode element downstream of the exit end of the constricting bore nozzle of said plasma torch body with said arc column passing at least axially part way through the exit bore of the anode element, and means for passing a flow of powder of materials to be melted into or near the exit of the plasma torch body nozzle bore and along said axial arc column in said primary jet stream.

14. The ultra high velocity dual stream flame spraying apparatus as claimed in claim 12, further comprising means for operating the internal burner at a pressure on the order of 100 psig to 600 psig to provide a secondary jet stream velocity of about 1000 to 4000 feet per second.

* * * * *